United States Patent Office 3,336,272
Patented Aug. 15, 1967

---

3,336,272
HYDROGENATED COPOLYMERS OF CONJUGATED DIOLEFINS AND SULFUR DIOXIDE
Edward A. Youngman, Lafayette, Ronald S. Bauer, Orinda, and Hans E. Lunk, Oakland, Calif., assignors to Shell Oil Company, New York, N.Y., a corporation of Delaware
No Drawing. Filed Feb. 11, 1965, Ser. No. 431,979
5 Claims. (Cl. 260—79.3)

This invention relates to novel polysulfones and more particularly to high molecular weight and highly crystalline and stable copolymeric polysulfones.

There has been in the past some interest in polysulfones in the preparation of fibers and other commercially useful products. However, these polysulfones have failed to be of commercial value, undoubtedly because of their high costs and/or poor characteristics and properties. The polysulfones have generally been prepared by oxidizing polythioethers or by copolymerizing unsaturated hydrocarbons and sulfur dioxide.

Polysulfone preparation by the former route requires production of polythioethers by reacting dimercaptides with non-conjugated diolefins or with dihalides. However, these reactions require the use of high purity monomers which at best produces polythioethers of relatively low molecular weights. Additionally, complete oxidation of the latter to the corresponding polysulfones has not been attained due to solubility and degradation problems. Thus, polysulfones prepared by this route have poor stability and color characteristics which are apparently due to the presence of intermediate polysulfoxides caused by incomplete oxidation and are thereby quite unsuitable for the manufacture of textiles and the like.

The other method most utilized for preparing polysulfones is that of copolymerizing an unsaturated hydrocarbon monomer and sulfur dioxide. A variety of monoolefinic hydrocarbons have been used such as ethylene, propylene, 1- and 2-butene, isobutylene, pentenes, cyclohexene, etc. The resulting polysulfone materials are alternating 1:1 copolymers having a repeating structural unit

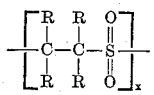

where R may be hydrogen or a hydrocarbyl group and $x$ is an average number which may be quite large.

Although some of these monoolefin-$SO_2$ copolymeric sulfones are of high molecular weight, the repeating structural unit has inherent deficiencies. Such copolymers are severely and rapidly degraded by even the mildest bases such as soaps and organic commercial detergents. They also undergo rapid thermal degradation at moderate temperatures, thereby reverting to the starting hydrocarbon monomers and sulfur dioxide. In addition, with the exception of the ethylene-$SO_2$ copolymer, these materials have poor crystallinity or they are amorphous. Where high molecular weight, stable and highly crystalline products are desired, such as in the preparation of molded materials, films, fibers and the like, these above-mentioned polysulfones are obviously inferior and unsatisfactory.

On the other hand, products obtained by copolymerizing butadiene and $SO_2$ have high molecular weights, high melting points and very high crystallinity while certain other diolefins yield copolymers which are poorly crystalline or amorphous and have low melting points. Both the crystalline and amorphous copolymers, however, also possess properties which make them generally unsuitable for many desired uses. In order to prepare useful products from resinous materials of this type, it is often necessary to heat them to a plastic or liquid state or to produce solutions of them such as in the preparation of moldings or castings or in the melt or solution spinning of fibers, and the like. However, the unsaturated diene polysulfones are thermally unstable. When heated to their flow temperatures, they rapidly decompose to their monomeric materials, e.g., butadiene and sulfur dioxide. In addition, the diene polysulfones are severely degraded by bases. As a result of this instability of the unsaturated polysulfones of this type known heretofore, no practical fabrication methods are known and they have no practical utility.

It is an object of this invention to provide novel, stable polysulfones having high molecular weight. These and other objects will become apparent and better understood from the following disclosure.

The novel polysulfones of this invention are hydrogenated copolymers of a conjugated diolefin and sulfur dioxide. The hydrogenated polymers, by virtue of their high molecular weights and stability at their melting point or flow temperatures, may be utilized in the preparation of molded products, free films, fibers and other plastic applications.

The conjugated diolefins used to prepare the copolymers are those having from 4 to about 8 carbon atoms and include 1,3-butadiene, 1,3-pentadiene (piperylene), 2-methyl-1,3-butadiene (isoprene), 1,3-hexadiene, 2,4-hexadiene, 1,3-cyclohexadiene, 2,3-dimethylbutadiene, 1,3- and 2,4-heptadiene, 1,3-cyclooctadiene, etc.

In preparing the unsaturated copolymers the polymerization reactions are catalyzed by a free radical initiator such as peroxides, azo compounds or inorganic oxidizing agents which react with sulfur dioxide to yield a redox initiator system. Some specific examples include hydrogen peroxide, benzoyl peroxide, cumene hydroperoxide, di-tert-butylperoxide, ascaridole, tert-butyl hydroperoxide, acetyl peroxide, peracetic acid, silver nitrate, lithium nitrate, ammonium nitrate, as well as chlorates, perchlorates, nitrites, persulfates, trimethylamine oxide, dimethylaniline oxide, nitric oxide, nitrogen dioxide, perchloric, nitric and nitrous acids, diisobutylene ozonide, azobisisobutyronitrile, etc. These catalysts may be present in amounts between about 0.01% and 5% and preferably between about 0.01% and 1.0% by weight.

The particular method used in the polymerization reaction is not critical. The reaction may proceed, for example, by emulsion, suspension or precipitation techniques or in solution.

By one method, the polymerization reaction may be carried out in solution wherein excess sulfur dioxide is the only solvent present, in which case the hydrocarbon monomer and initiator may simply be added to the sulfur dioxide or vice versa. Other solvents in which the monomeric materials are miscible, such as lower aliphatic alcohols, and aliphatic and aromatic hydrocarbons, may also be present. The unsaturated copolymer formed in the presence of these solvents will precipitate out upon formation and may thus be directly recovered.

Another method of carrying out the polymerization is in the presence of sulfolane or a phenolic compound in which the polysulfone reaction products are soluble or swollen. A special advantage of using these solvents in the polymerization reaction is that the reaction solution containing the unsaturated polysulfone may be directly hydrogenated without first isolating the polysulfone, as will be more fully set forth below. This method of preparing the polysulfones of this invention is not only advantageous from a practical standpoint but is unexpected since phenolic compounds are notorious for their chain transfer properties which causes them to severely limit molecular weight and behave generally as polymerization retarders or inhibitors. However, when the reaction is accomplished in a phenolic compound such as m-cresol, phenol, p-chlorophenol, and the like, polymeric sulfones of high molecular weight are obtained.

To avoid the necessity of using large amounts of sulfur dioxide the emulsion technique may be used. In that technique, the copolymerization takes place generally in an aqueous medium with the aid of emulsifying agents.

The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples include the alkali metal salts of $C_{12}$ to $C_{18}$ straight chain carboxylic acids, e.g., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The order in which the ingredients are added or mixed is not critical and generally any convenient method of preparing the reaction mixture may be utilized. It may be found convenient, for example, to add sulfur dioxide in liquid form at temperatures below $-10°$ C. Where such technique is used, it is preferable to have an aqueous phase which freezes at a lower temperature than $-10°$ C. wherein the presence of an alcohol or glycols with the water is satisfactory. Thus, the liquid sulfur dioxide may be added to the liquid aqueous phase conveniently without boiling. To this mixture is added the conjugated diolefin monomer. The polymerization reaction temperature may be between about $-60°$ C. and about $120°$ C.

The molecular weight of the unhydrogenated polymeric sulfones may be controlled over a wide range by adjusting the polymerization conditions.

The relative proportions of monomers used in preparing the polymers are not critical. It has been found that the polysulfones prepared as set forth above have an essentially perfect alternating $+A-SO_2+$ structure where A represents one molecule of hydrocarbon monomer, regardless of the ratio of hydrocarbon:sulfur dioxide present in the reaction mixture. Thus, a very large excess of sulfur dioxide may be employed or alternatively an excess of hydrocarbon monomer may be used since the copolymerization with sulfur dioxide is much faster than the hydrocarbon homopolymerization. The most desirable ratio of reactants will vary from case to case and can be determined readily by those skilled in the art.

Prior to hydrogenation the copolymeric polysulfone is swollen or dissolved, suitable solvents being sulfolane, perfluoroalcohols such as perfluoroethanol, perfluoroisopropanol, etc. and especially the phenolic solvents such as phenol, p-chlorophenol, m-cresol, catechol, hydroquinone, pyrogallol, resorcinol, alpha-naphthaol, or mixtures thereof. Phenol, chlorophenols and the cresols are preferred. In the case of a number of the unsaturated copolymeric polysulfones and especially the butadiene-sulfur dioxide copolymer, the polymer-solvent interaction at temperatures below the decomposition point may be limited to swelling.

The catalyst systems used in the hydrogenation reaction may be heterogeneous or homogeneous. Suitable heterogeneous catalysts include for example, platinum, rhodium, osmium, ruthenium, iridium, palladium, rhenium, nickel, cobalt and compounds thereof such as oxides, sulfides, carbonyls, etc. These catalysts may be used alone or supported on a relatively inert material such as carbon, diatomaceous earth, alumina, silica, etc. in amounts of between about 0.01 and 10% by weight of the polymer. More efficient hydrogenation may be achieved by keeping the catalyst dispersed throughout the reaction mixture.

Homogeneous catalysts offer the advantage of being rapidly dispersed throughout the reaction medium and are less readily poisoned, thus permitting hydrogenation of copolymeric polysulfones which are only swollen by the solvent. Such homogeneous catalysts include among others the rhodium systems disclosed in copending application Ser. No. 417,482, filed Dec. 10, 1964, the descriptions of which are incorporated here by reference and used in amounts to provide from about 50 to 2000 p.p.m. rhodium based on the polymer. Preferred catalysts of this type are rhodium halide complexes such as trichlorotris (triphenarsine)rhodium (III) and chlorotris(triphenylphosphine)rhodium (I).

It is known that sulfur dioxide is poisonous to most catalysts, thereby rendering them ineffective for hydrogenation; the presence of free sulfur dioxide should be avoided at the time of hydrogenation. This is especially important when the hydrogenation directly follows the copolymerization by a method wherein an excess of sulfur dioxide is used or when polymerization is interrupted before complete conversion of the monomers.

The hydrogenation reaction temperature may be from about room temperature, i.e., $20°$ C. to about $200°$ C. with temperatures between about $80°$ and $130°$ C. being preferred. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. or higher may be used; the preferred range is between about 500 and 2,000 p.s.i. The hydrogen may be bubbled through the polymer-containing solution or may be charged into a closed reaction vessel under pressure and then mixed with the solution or slurry of swollen polymer by suitable means.

The hydrogenation process as disclosed herein only affects the ethylenically unsaturated linkages of the molecules and in no way reduces the stable sulfone portions of the polymer. Desirable product properties are attained by reducing the original ethylenic unsaturation by at least about 50% and up to 100%. Although for some products complete hydrogenation may be desirable it is not necessary since any degree of hydrogenation above about 50% but less than 100% results in highly stable polymers and in the case of the highly crystalline copolymeric sulfones it is found that above about 50% the degree of hydrogenation may be varied without greatly sacrificing crystallinity. The hydrogenated polymers have molecular weights of between 20,000 and 1,000,000 as characterized by intrinsic viscosity of from about 0.5 to 5.5 dl/g., determined in a 1:1 mixture of p-chlorophenol:m-cresol at $25°$ C.

The following examples are provided to illustrate the manner in which the invention is carried out. It is to be understood that the examples given for the purpose of illustration only and the invention is not to be regarded as limited to any of the specific compounds or conditions recited therein. Unless otherwise indicated, parts disclosed in the examples are given by weight.

*Example 1*

An unsaturated polysulfone was prepared by copolymerizing butadiene and sulfur dioxide as follows: To an 8 oz. bottle was added 100 ml. water, 1 g. of sodium lauryl sulfate, 0.25 g. of $NH_4NO_3$ and 50 g. of liquid sulfur dioxide, the temperature of the mixture being maintained at about $-11°$ C. Butadiene (15 g.) was then added to the bottle which was closed and the contents thoroughly agitated for 16 hours at 10° C. The insoluble unsaturated copolymer product was present as a white slurry and was filtered and washed with methanol and dried.

One gram of the isolated, dried powdery copolymer was suspended in 300 ml. of p-chlorophenol by rapidly agitating in a semi-micro blender. This suspension was placed in the glass liner of a 300 ml. autoclave to which was added 0.030 g. trichlorotris(diethylphenylarsine)rhodium (III) and 0.60 g. triphenylphosphine. The liner was placed in an autoclave. After purging the vessel with hydrogen, the pressure was increased to 1122 p.s.i. and the reaction mixture heated to about 128° C. for 67 hours.

The reaction product, a homogeneous solution, was worked up by pouring into methanol which was being agitated in a Waring Blendor. The polymer, which is insoluble in the alcohol, precipitated out of solution and was filtered off. The methanol washing was repeated until no more yellow color of the catalyst could be observed in the filtrate. The dried polysulfone was shown by infrared analysis to be completely saturated; it melted at 282° C. and had an intrinsic viscosity of 2.0 dl/g. in 1:1 p-chlorophenol:m-cresol at 25° C. It was shown to have the composition $(CH_2-CH_2-CH_2-CH_2-SO_2)_x$ by elemental analyses.

Comparatively, an unhydrogenated butadiene-sulfur dioxide copolymeric sulfone prepared in the same manner rapidly decomposed at 225° C. at which temperature no melting of the polymer had occurred.

*Example II*

A sulfur dioxide-isoprene copolymer was prepared by the same procedure as set forth in Example I. The unsaturated copolymer was hydrogenated to produce polymers having 40%, 20% and none of the original ethylenic unsaturation. These stable polysulfones had melting points of 165°, 215° and 235° C., $T_{1/2}$ of 321, 361 and 388° C., respectively, with the 80% hydrogenated copolymer having an intrinsic viscosity 1.52 dl/g. in 1:1 p-chlorophenol:m-cresol at 25° C. By comparison the unhydrogenated copolymer had a melting point of 117° C. and a $T_{1/2}$ of 266° C. ($T_{1/2}$ or half decomposition point is the temperature at which one half of the original polymer weight is lost at a heating rate of 2½° C. per minute under nitrogen.)

*Example III*

The process of Example I was repeated substituting piperylene for butadiene. The unsaturated copolymer was hydrogenated to complete saturation as evidenced by infrared analysis. The polymer had a melting point of 167° C., a $T_{1/2}$ of 353° C. and an intrinsic viscosity of 3.6 dl/g. in 1:1 p-chlorophenol:m-cresol at 25° C.

By comparison the unhydrogenated piperylene-sulfur dioxide copolymer had a $T_{1/2}$ of 220° C. and a melting point of 123° C.

*Example IV*

The process of Example I was repeated. The unhydrogenated copolymer was hydrogenated to about 98%, as evidenced by infrared analysis, and had a melting point of 281° C.

Novel features of the methods disclosed herein for producing the claimed hydrogenated polysulfones are disclosed in greater detail and claimed in copending application Ser. No. 431,856, filed Feb. 11, 1965.

We claim as our invention:

1. A normally solid, hydrogenated copolymer of sulfur dioxide and a diene selected from the group consisting of conjungated dienes having from 4 to about 8 carbon atoms per molecule, said copolymer consisting essentially of recurring —$SO_2$— units alternating with recurring hydrocarbon radicals derived from one molecule of said diene and having in the unhydrogenated state one ethylenically unsaturated site per diene unit, the residual unsaturation in said hydrogenated copolymer being less than about 50%.

2. The hydrogenated copolymer of claim 1 wherein the conjungated diene is butadiene.

3. The hydrogenated copolymer of claim 1 wherein the conjugated diene is isoprene.

4. The hydrogenated copolymer of claim 1 wherein the conjugated diene is piperylene.

5. A normally solid, hydrogenated copolymer of sulfur dioxide and a diene selected from the group consisting of conjugated dienes having from 4 to about 8 carbon atoms per molecule, said copolymer consisting essentially of recurring —$SO_2$— units alternating with recurring hydrocarbon radicals derived from one molecule of said diene and having in the unhydrogenated state one ethylenically unsaturated site per diene unit, said copolymer having an intrinsic viscosity of from about 0.5 to about 5.5 determined in a 50:50 mixture of m-cresol and p-chlorophenol at 25° C., and having a residual unsaturation of less than about 50%.

References Cited

UNITED STATES PATENTS

| | | | |
|---|---|---|---|
| 2,293,023 | 8/1942 | Hills et al. | 260—79.3 |
| 2,625,525 | 1/1953 | Lynch | 260—79.3 |

JOSEPH L. SCHOFER, *Primary Examiner.*

D. K. DENENBERG, *Assistant Examiner.*